United States Patent

[11] 3,562,490

| | | |
|---|---|---|
| [72] | Inventor | James A. Leach<br>Shelby, Ohio |
| [21] | Appl. No. | 724,024 |
| [22] | Filed | Apr. 25, 1968 |
| [45] | Patented | Feb. 9, 1971 |
| [73] | Assignee | Westinghouse Electric Corporation<br>Pittsburgh, Pa.<br>a corporation of Pennsylvania |

[54] HEAT-CLEANING CONTROL SYSTEM FOR OVEN
3 Claims, 4 Drawing Figs.

[52] U.S. Cl. .................................................... 219/492,
219/494
[51] Int. Cl. ..................................................... H05b 1/02
[50] Field of Search........................................... 219/492,
493, 393; 200/38A2; 337/301, 390; 307/1, 41;
219/491, 412—414; 219/492, 494

[56] References Cited
UNITED STATES PATENTS

| 1,812,628 | 6/1931 | Geiger........................... | 307/141X |
| 3,149,214 | 9/1964 | Weeks............................ | 219/491X |
| 2,842,200 | 7/1958 | Graham.......................... | 219/492 |
| 3,327,094 | 6/1967 | Martin et al. ................. | 219/393 |

*Primary Examiner*—Bernard A. Gilheany
*Assistant Examiner*—F. E. Bell
*Attorneys*—F. H. Henson, R. T. French and E. C. Arenz ABSTRACT: The titled apparatus in which the oven is maintained in a heat-cleaning temperature range for a period corresponding to a selected number of cycles of the oven clean-temperature thermostat.

HEAT-CLEANING CONTROL SYSTEM FOR OVEN

BACKGROUND OF THE INVENTION

1. Field of the Invention

The invention pertains to the art of control systems for heat-cleaning ovens.

2. Description of the Prior Art

The usual way of controlling the duration of the cleaning cycle of most heat-cleaning domestic ovens is by using a simple timer. The timer is started when the oven is set to start cleaning operation so that the time required to raise the oven temperature up to the range of cleaning temperatures, and its period in the cleaning temperature range, is included in the timer cycle. Thus a number of uncontrolled factors bear on the length of time that the oven is maintained at sufficiently high temperatures to effect cleaning. Such factors include variations in heat output ratings of the particular heating means used, ambient temperature variations, the difference in heat loss characteristics between different ovens and where the heating means is energized in a pulsing fashion, the calibration of the pulsing means.

SUMMARY OF THE INVENTION

I propose, in accordance with my invention, that the duration of the heat-cleaning period be made responsive to the accumulation of a selected number of cycles of the upper temperature limit (i.e., clean) thermostat. Means are provided which effectively counts the cycles of the clean thermostat and terminates heating of the oven after the oven heating means has been cycled by the upper limit thermostat a selected number of times. This system of control may be conveniently accomplished, in one way, by providing a clean thermostat which, when it opens a circuit to interrupt the heating means in the oven, closes a circuit to energize a solenoid to move counting means one step. Then when the clean thermostat causes the oven heating means to be energized again in response to a falling temperature in the oven, the solenoid is deenergized and its plunger restored to its initial position. Thus each cycle of the clean thermostat is counted, and after a selected number of thermostat cycles heating of the oven for heat cleaning purposes is terminated.

DRAWING DESCRIPTION

CURRENTLY PREFERRED EMBODIMENT

Figure 1:
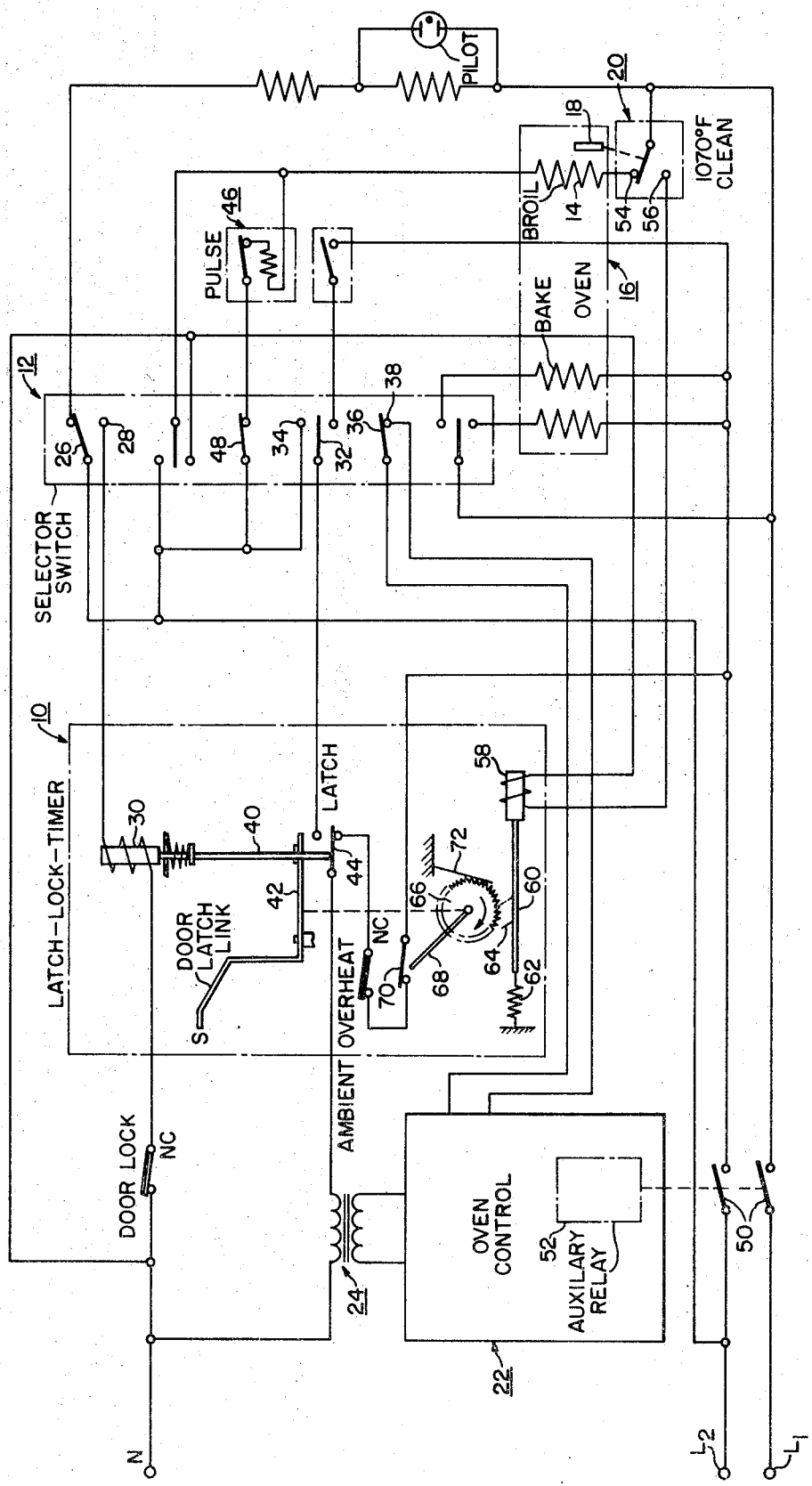
FIG. 1 is a partly diagrammatic and schematic view of one electrical circuit for an oven incorporating the invention.

The main parts of the circuit (FIG. 1) of primary interest in connection with the invention are generally designated as follows: latch lock and timer assembly 10, the oven selector switch 12, the broil heater 14 in the oven cavity 16, the upper limit (i.e., clean) thermostat sensor 18 and its control switch 20, the oven control 22, and the transformer 24.

A part of the circuit is shown simply for purposes of example of one embodiment in which the invention may be usefully employed, and thus certain parts will only be briefly reviewed as to their nature and function. For a fuller explanation of certain parts of the circuit arrangement in a compatible heat-cleaning oven system, and the manner in which it operates, reference should be had to the following commonly assigned U.S. patent applications: Kastovich Ser. No. 552,663, Holtkamp Ser. No. 531,858, Nagel Ser. No. 546,093, Nagel Ser. No. 545,967, and Holtkamp Ser. No. 545,894. The subjects with which the noted applications deal are, respectively, the manner in which heat is applied to the oven for a high temperature, quick cleaning cycle; the pulsing of the heating means; a prior art timer arrangement; the door latching and locking means; and a linking arrangement between the latch and lock means.

It will be appreciated that it is common practice in connection with heat-cleaning ovens to provide means that insure that the oven door is latched shut before a heat-cleaning cycle is initiated, and is in a condition to permit locking of the door as the temperature in the oven rises into the heat-cleaning range. An arrangement which functions in that manner may be provided in various ways, one of which is illustrated in the drawings.

To initiate a heat-cleaning cycle with the circuit of FIG. 1, the selector switch 12 is turned to a latch position in which the movable contact 26 closes to terminal 28 to energize the solenoid 30 of the latch lock and timer assembly 10, movable contact 32 closes to terminal 34 to energize the transformer 24 primary, and movable contact 36 closes to terminal 38 to close a circuit connected to the oven control 22 in a manner which prevents the oven control from responding as it normally does in cooking operations.

Energization of the solenoid 30 causes it to emit a signal, such as a buzz, which tells the operator the latch mechanism should be manually moved to a position latching the oven door shut. Energization of the solenoid also lifts the pin 40 so that it does not travel with the link bar 42 which is moved by the manual latching operation. While the pin is lifted due to energization of solenoid, the operator turns the selector switch to a "clean" position. In the clean position the selector switch movable contacts assume the terminal positions illustrated in FIG. 1. As such, the solenoid 30 is deenergized so that its pin 40 is dropped into its illustrated lowered position, which closes the switch 44. The blocking position of the link bar 42 prevents the door from being unlatched until the pin 40 is removed from the blocking position. The system is now in a condition permitting the rise of the oven cavity temperatures into the heat-cleaning range.

The broil heater 14, which in the preferred embodiment illustrated furnishes all of the heat for heat-cleaning purposes, is energized by being connected to the power source $L_1$ and $L_2$ through selector switch contact 48, pulsing switch 46, clean thermostat switch 20 in its illustrated position, and the closed double-pole switch 50 controlled by the auxiliary relay 52 of the oven control 22.

In the normal heat-cleaning cycle, the clean thermostat switch 20 will begin to cycle when the oven cavity temperature first reaches the upper temperature limit to which it is calibrated. For example, it will open from the terminal 54 connected to the broil heater 14, and close to the terminal 56, when the oven cavity reaches, say, 1,070° F. Then as the oven cavity temperature falls to, say, 1010° F., it will open from terminal 56 and again close to terminal 54. In accordance with the invention, this cycling of the clean thermostat is counted through means now to be described for the purpose of timing the duration of the cleaning operation.

When the clean thermostat switch closes to terminal 56, the solenoid 58 in the latch lock and timer assembly is energized between neutral and $L_1$ and pulls solenoid plunger 60 against return spring 62 to the right as viewed in FIG. 1 and moves driving pawl 64 to its broken line position. When the clean thermostat 20 again closes to its terminal 54 position, the solenoid 58 is deenergized so that the plunger 60 is moved to the left by the return spring 62. This causes the driving pawl 64 to engage against a tooth of the wheel 66 (which has been moved into a position to be engaged by the means to be later described) so that the wheel is rotated one step in the direction indicated by the arrow. This results in the angular displacement of the arm 68, which is carried by the wheel, toward a position which will ultimately open the terminating switch 70.

The wheel is held in its one-step rotated position by the holding pawl 72. As the cycling of temperature clean thermostat switch 20 continues, the counter wheel 66 is rotated one step each time the solenoid 58 terminal energized until the termination switch 70 14, and opened by the arm 68. This deenergizes the transformer 24 primary circuit, which results in opening of the relay switch 50, and the termination of the heating cycle for heat-cleaning purposes. The cleaning cycle and all heating in the oven is accordingly automatically terminated, and after the oven has cooled down to below the heat-cleaning temperature range, it may be restored to a condition for normal cooking operations by turning the selector switch first to a latch position, unlatching the door, and then turning the selector switch to an off position.

Figure 2:
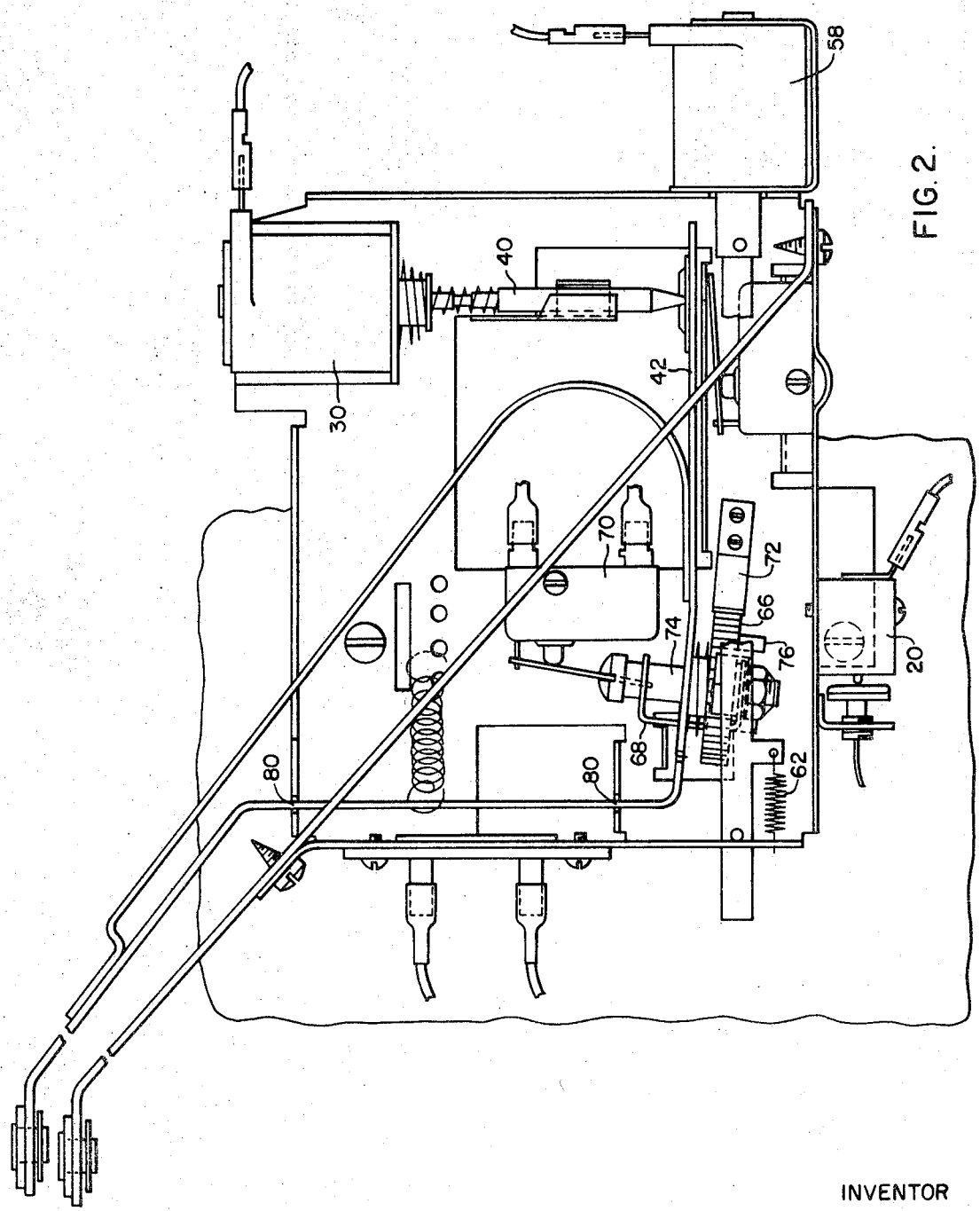
FIG. 2 is a fragmentary rear elevation view of a latch and lock assembly.

One mechanism for carrying out the portion of the inventive arrangement involving the counting and the opening of the switch to open the transformer circuit is illustrated in FIGS. 2-—4. As may be there seen, the ratchet or counting wheel 66 is carried on the link bar 42 for rotation about the wheel axle or bolt 74. The arm 68 which is adapted to operate the termination switch 70 is a U-shaped wire form member carried at the ends of its legs from the bolt for turning movement about the axis of the bolt. The wheel 66 includes lug means 76 (FIG. 2) depending from the lower surface of the wheel and disposed to engage the lower leg of the arm 68 when the wheel rotates sufficiently in either direction. A helical return spring 78 also connected to the link bar and to the wheel so that the wheel will be rotated in a counterclockwise direction when released from its holding pawl 72. It will be appreciated that other arrangements may be devised for providing an operating arm 68 in connection with counting wheel 66 and for insuring its return from a position opening switch 70, but the described arrangement serves quite satisfactorily and utilizes in part the teachings of the noted Nagel patent application Ser. No. 546,093.

When the latching mechanism for the oven is moved from an unlatched position (FIG. 3) to a latched position (FIG. 4), the latch bar 42 pivots about vertically aligned points 80, as taught in the noted Nagel patent application Ser. No. 545,967. This carries the wheel 66 out to the FIG. 4 position in which the teeth can be engaged by the driving pawl 64, and in which the holding pawl 72 frictionally engages the periphery of the wheel to brake the return force of the return spring 78 as the wheel is stepped around.

In the illustrated views, the solenoid 58 is shown with its driving pawl and arm in a position corresponding to the solenoid being deenergized. When the solenoid is energized by the clean thermostat being satisfied, it draws its plunger 60 to the right against the tension force of the return spring 62. Then when the clean thermostat again calls for heat in the oven cavity, the solenoid is deenergized and the spring 62 draws the plunger to the left with driving pawl 64 engaging a tooth of the wheel and rotating it in a clockwise direction. Thus the wheel is rotated one step with each stroke of the plunger. The stroke distance is of course established to correspond with the desired cleaning time for the oven. After the selected number of steps of the wheel, the depending leg 76 engages the wire form arm 68 and subsequently drives the arm into contact with the operating lever 80 of the termination switch 70. This breaks the circuit to the primary of the transformer 24 (FIG. 1) so that heating of the oven cavity is terminated through opening of the relay switch 50.

Figure 3:
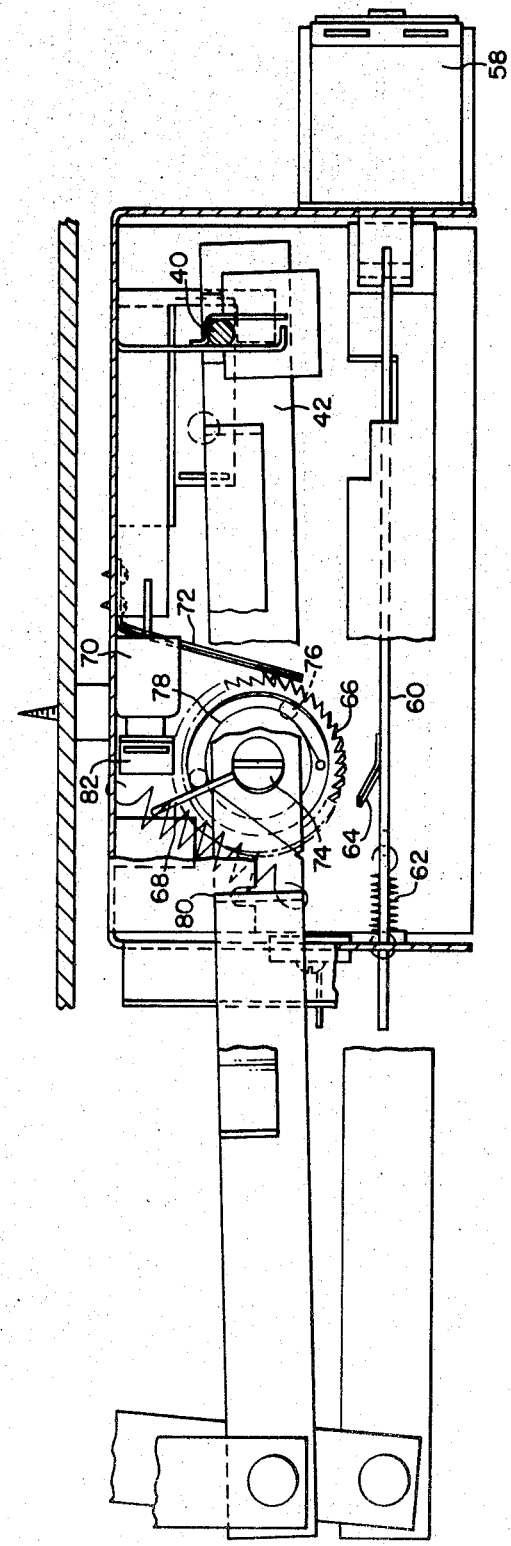
FIG. 3 is a fragmentary plan view of the assembly of FIG. 2 with certain movable parts associated with the latching mechanism shown in a position corresponding to an unlatched condition of the oven door.
Figure 4:
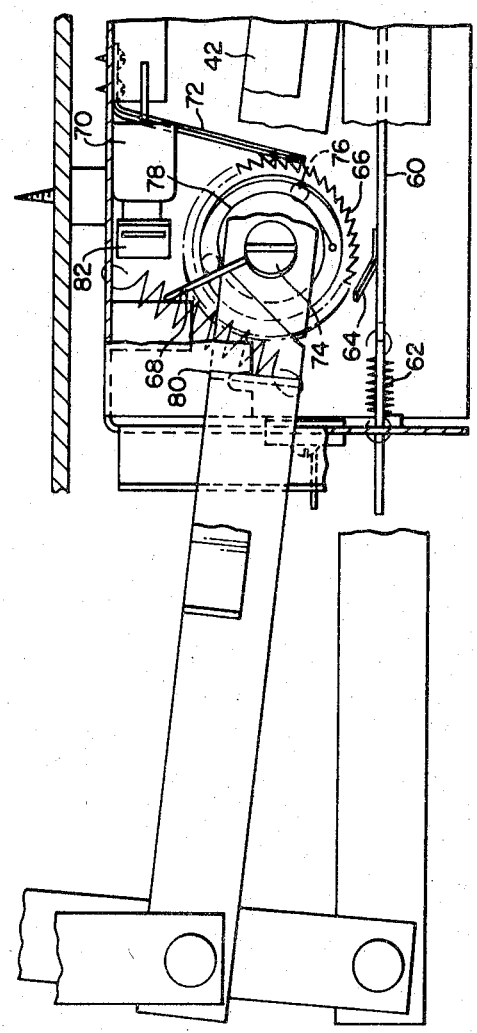
FIG. 4 is a fragmentary plan view similar to FIG. 3, but showing the movable parts in a position corresponding to a latched condition of the oven door.

When the latch means for the oven door is subsequently operated to permit opening of the oven door, the link bar 42 is moved back to its FIG. 3 position so that the counting wheel 66 is released from its advanced clockwise position and returns to its counterclockwise position under the force of the helical spring 78 biasing the counting wheel in a counterclockwise direction.

It will be appreciated that by beginning the time of the heat-cleaning cycle (i.e., the period that the oven cavity is maintained in the high temperature heat-cleaning range) when the clean thermostat starts to cycle, rather than by starting the timing of the total heat-up and heat-cleaning cycle when the heating means is first energized, variations in the cleaning cycle time arising from the different characteristics of different ovens and other elements is substantially reduced. Further, with this arrangement, interruptions in the energization of the heating means as the temperature in the oven cavity is rising toward the upper limit, are of insignificant effect if they should occur. Other advantages will also suggest themselves to those skilled in the art.

While the invention has been described in connection with one particular type of heat-cleaning oven in which the teachings of others not bearing directly on my invention have been followed for purposes of convenience in description, it will be appreciated that the invention is applicable to heat-cleaning ovens utilizing other structural and operational arrangements. For example, if a gas supply is used for a heat source, the cycling of the gas valve may be used as the trigger for counting purposes.

I claim:

1. In a heat cleaning oven having a door and latching means therefor, a control system comprising:
   means for heating said oven into a heat cleaning temperature range;
   first switch means, including front and back contacts, responsive to the temperatures produced in said oven to open and close said front contacts to cycle said heating means to maintain oven temperatures within a temperature range selected to effect heat cleaning, said back contacts being closed and opened alternately with said front contacts;
   solenoid means energized and deenergized by closing and opening, respectively, said back contacts;
   counting means movable in successive steps in accordance with energization of said solenoid; and
   second switch means operated to an open position by said counting means after a selected number of said cycles of said heating means to terminate heating by said heating means.

2. In a system according to claim 1 including: means mounting said counting means for movement into and out of position for operation by said solenoid in accordance with operation of said latching means.

3. In a system according to claim 2 including: means biasing said counting means to an initial position when said counting means is out of position for operation by said solenoid.